(12) United States Patent
Baur

(10) Patent No.: US 10,967,971 B2
(45) Date of Patent: Apr. 6, 2021

(54) VEHICLE VISION SYSTEM USING AERIAL CAMERA

(71) Applicant: MAGNA MIRRORS OF AMERICA, INC., Holland, MI (US)

(72) Inventor: Michael J. Baur, Kentwood, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/792,437

(22) Filed: Feb. 17, 2020

(65) Prior Publication Data

US 2020/0180762 A1 Jun. 11, 2020

Related U.S. Application Data

(63) Continuation of application No. 15/815,090, filed on Nov. 16, 2017, now Pat. No. 10,562,624.

(60) Provisional application No. 62/423,798, filed on Nov. 18, 2016.

(51) Int. Cl.
*B60R 1/00* (2006.01)
*B64C 39/02* (2006.01)
*G05D 1/00* (2006.01)
*G06K 9/00* (2006.01)

(52) U.S. Cl.
CPC .............. *B64C 39/024* (2013.01); *B60R 1/00* (2013.01); *G05D 1/0038* (2013.01); *G05D 1/0094* (2013.01); *G06K 9/00651* (2013.01); *G06K 9/00798* (2013.01); *B60R 2300/101* (2013.01); *B60R 2300/105* (2013.01); *B60R 2300/107* (2013.01); *B60R 2300/406* (2013.01); *B64C 2201/127* (2013.01); *B64C 2201/146* (2013.01); *B64C 2201/148* (2013.01); *B64C 2201/208* (2013.01)

(58) Field of Classification Search
None
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,690,268 | B2 | 2/2004 | Schofield et al. |
| 6,693,517 | B2 | 2/2004 | McCarthy et al. |
| 6,946,978 | B2 | 9/2005 | Schofield |
| 7,004,606 | B2 | 2/2006 | Schofield |
| 7,005,974 | B2 | 2/2006 | McMahon et al. |
| 7,038,577 | B2 | 5/2006 | Pawlicki et al. |

(Continued)

*Primary Examiner* — James M McPherson
(74) *Attorney, Agent, or Firm* — Honigman LLP

(57) ABSTRACT

A vision system for a vehicle includes a forward viewing camera disposed at a vehicle and viewing forward of the vehicle through the windshield. A control is disposed at the vehicle and includes an image processor operable to process image data captured by the forward viewing camera. An aerial platform is detachably disposed at the vehicle and is operable to detach from and fly at least above the vehicle. The aerial platform includes a drone camera that captures image data and the image data captured by the drone camera is wirelessly communicated to the control. A video display is disposed in the vehicle and is viewable by a driver of the vehicle. The video display, with the aerial platform detached from the vehicle and flying at least above the vehicle, displays video images derived from image data captured by the drone camera for viewing by the driver of the vehicle.

33 Claims, 3 Drawing Sheets

(56) References Cited

U.S. PATENT DOCUMENTS

| | | |
|---|---|---|
| 7,123,168 B2 | 10/2006 | Schofield |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,580,795 B2 | 8/2009 | McCarthy et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,855,755 B2 | 12/2010 | Weller et al. |
| 7,937,667 B2 | 5/2011 | Kramer et al. |
| 10,562,624 B2 | 2/2020 | Baur |
| 2012/0062743 A1 | 3/2012 | Lynam et al. |
| 2012/0218412 A1 | 8/2012 | Dellantoni et al. |
| 2013/0222592 A1 | 8/2013 | Gieseke |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |

VEHICLE VISION SYSTEM USING AERIAL CAMERA

CROSS REFERENCE TO RELATED APPLICATIONS

The present application is a continuation of U.S. patent application Ser. No. 15/815,090, filed Nov. 16, 2017, now U.S. Pat. No. 10,562,624, which claims the filing benefits of U.S. provisional application Ser. No. 62/423,798, filed Nov. 18, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides at least one aerial camera (such as a camera mounted on an aerial platform or drone) such that the aerial camera may be elevated above the vehicle to provide enhanced viewing and imaging of areas ahead of the vehicle that may otherwise be blocked or not viewable by a camera disposed at the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

The camera or cameras (and processing of image data captured by the camera or cameras) can thus provide both drivers and automated driving systems (such as autonomous or semi-autonomous driving systems) information to enhance vehicle safety and maneuverability. However, cameras disposed at a vehicle are limited by the physics and the physical location where the camera is mounted at the vehicle.

Figure 1:
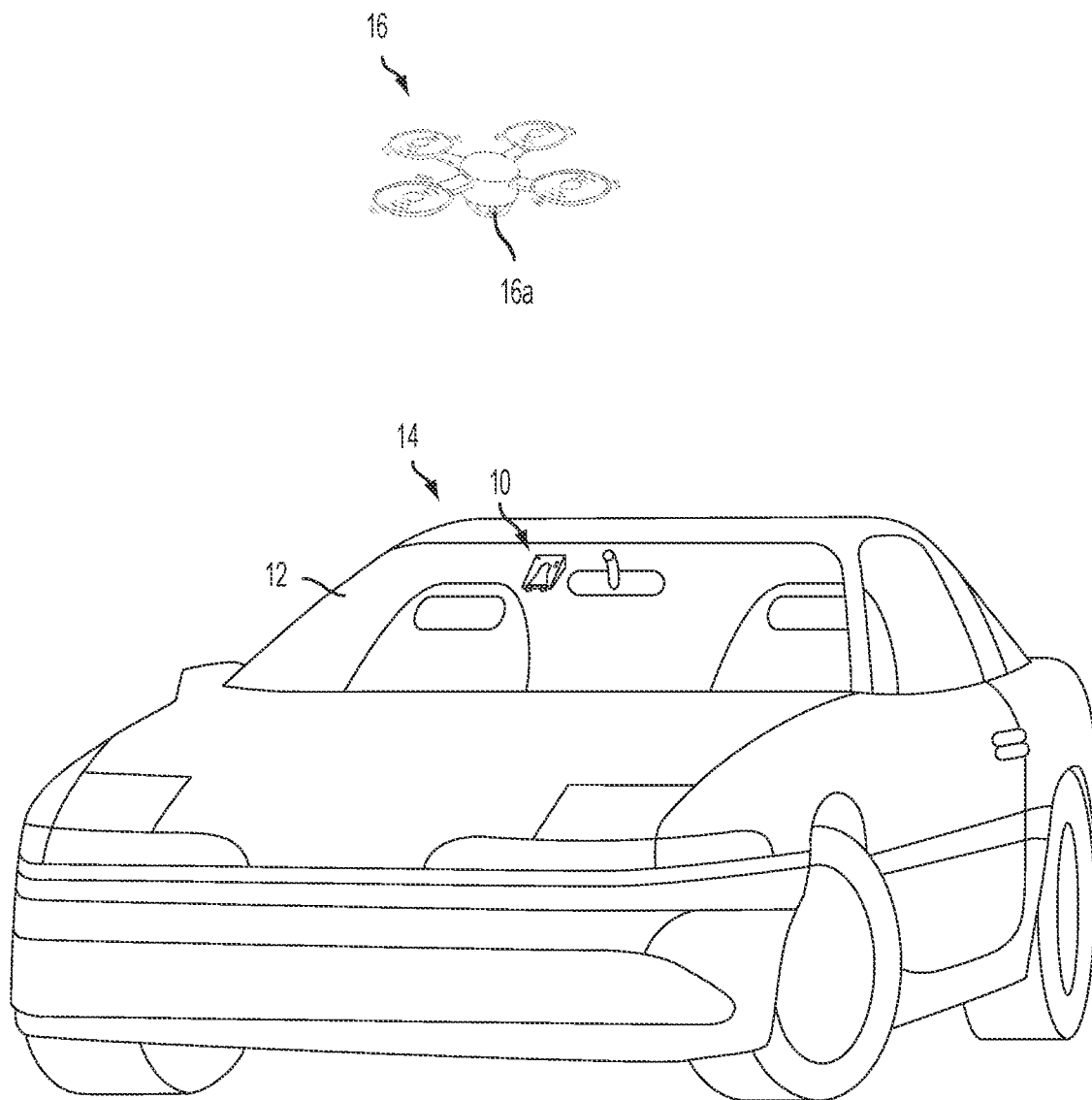
FIG. 1 is a perspective view of a vehicle equipped with a vision system that incorporates a windshield mounted camera having a field of view forward of the vehicle, and that includes an aerial platform or drone with a drone camera, in accordance with the present invention.
Figure 2:
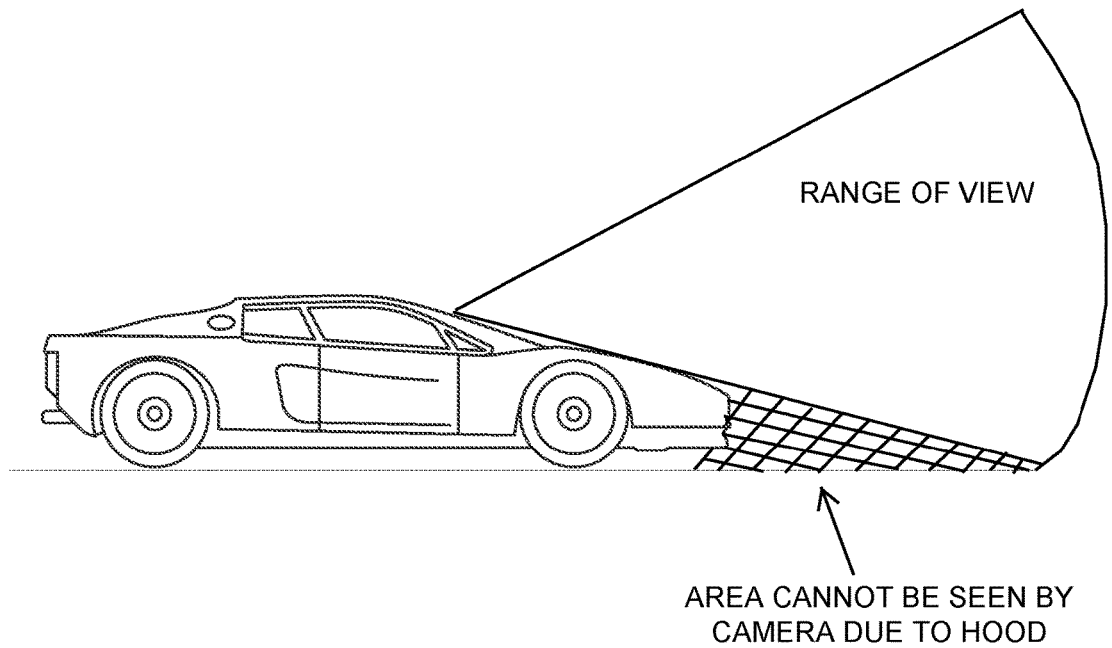
FIG. 2 is a side elevation of the vehicle of FIG. 1, showing the forward field of view of the windshield mounted camera obstructed by the hood of the vehicle.
Figure 3:
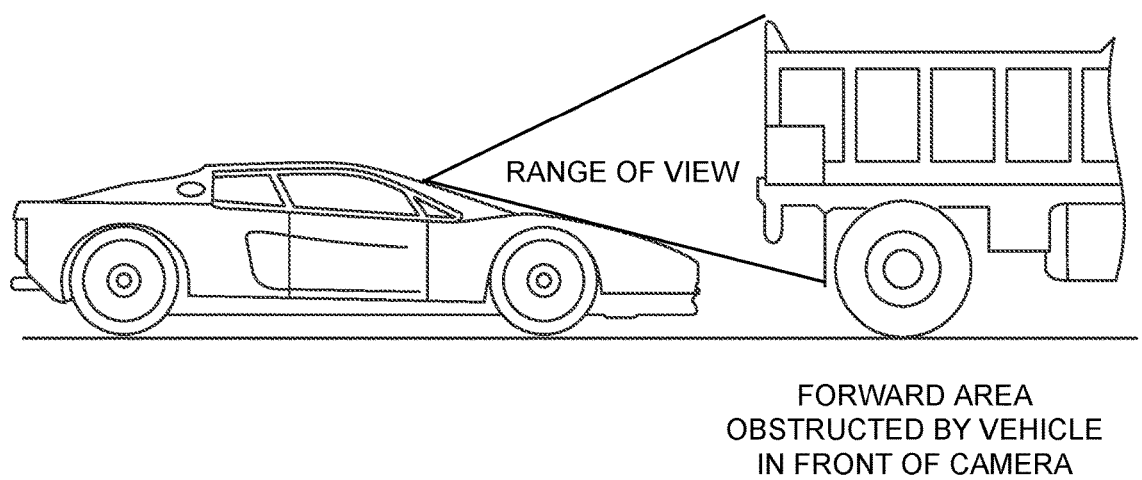
FIG. 3 is another side elevation of the vehicle of FIG. 1, showing the forward field of view of the windshield mounted camera being obstructed by a truck in front of the vehicle.

For example, and such as shown in FIG. 1, a system may include a forward viewing camera 10, such as a camera mounted at and behind a windshield 12 of a vehicle 14, with the camera viewing forwardly through the windshield (such as through an area of the windshield swept or kept clean by the windshield wipers of the vehicle) and in the direction of forward travel of the vehicle. With the camera located at an upper region of the windshield, the camera cannot view directly in front of the vehicle due to the hood of the vehicle (see FIG. 2). Also, such a camera may have its view obstructed by other vehicles or trucks in front of the equipped vehicle (see FIG. 3).

Figure 4:
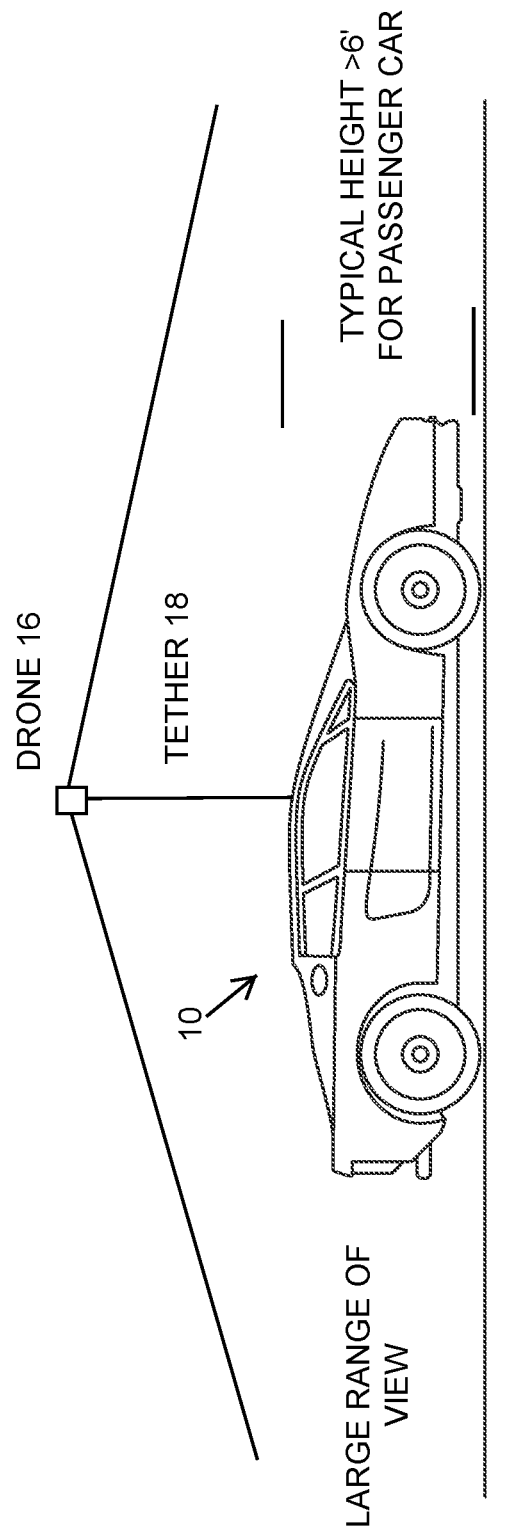
FIG. 4 is a side elevation of a vehicle utilizing an aerial camera in accordance with the present invention.

The present invention incorporates an aerial platform or drone 16 at or in a vehicle 10 (as shown in FIGS. 1 and 4). The aerial platform or drone includes a platform or body that has a plurality of rotors or propellers or blades that are operable to elevate and maneuver or fly the aerial platform or drone via remote control or autonomous control or the like. The aerial platform or drone includes one or more cameras 16a for transmission of captured images for viewing by an operator of the drone. By incorporating such a drone in or at a vehicle, numerous advantages can be achieved. The drone, when deployed to fly over the vehicle (or around or near the vehicle), captures image data via its camera, whereby the captured image data may be communicated to the vision system of the vehicle, such as for image processing for object detection or the like, or for display of images for viewing by the driver of the vehicle. The drone may be vehicle specific and may follow the individual vehicle for which it is designated. Optionally, for larger vehicles, such as a bus or a truck, two or more drones may be designated for or incorporated at that vehicle.

Optionally, the drone may be tethered to the vehicle (such as via tether or cable or line 18 in FIG. 4) to provide a secure mount and power and communication (such as via an electrically conductive communication link), or the drone may be battery operated and may communicate with the vehicle vision system via a wireless communication link or the like. The drone may be deployed and used as needed, such as in traffic or for specific maneuvering of the vehicle.

The drone may be operable in a manner to avoid objects in its path of travel. Such objects may be avoided by keeping the drone height (as it is flying) above the ground to at or below levels based on standard commercial vehicle maximums (to avoid bridges, overpasses or the like). The drone may also be responsive to a GPS system of the vehicle (or the drone), where GPS identification of low clearance areas and the like may be used to adjust the drone's path of travel to avoid objects or the like.

Optionally, in some situations, the drone may achieve greater elevation in order to enhance visibility. For example, when the vehicle is stopped in heavy traffic (or is travelling very slowly in traffic), the drone's elevation may increase to allow the driver to view the area ahead of the vehicle to decide or select an alternative course of action or path of travel of the vehicle.

The image data captured by the drone camera is communicated to the control disposed at the vehicle, where the image data may be processed for object detection and/or may be used for display of images derived therefrom. For example, an image processor at the vehicle may process the image data captured by the drone camera to detect objects or other vehicles or the like in the field of view of the drone camera. Responsive to the image processing, the control may determine a high traffic condition or accident ahead of the equipped vehicle (but not yet in the driver's view or the vehicle camera's field of view), and the control may generate a communication or alert to the driver (such as an audible alert or a visual display or the like) that is indicative of or representative of the detected or determined traffic condition ahead of the vehicle. Optionally, the communication may comprise display of images derived from the image data captured by the drone camera.

Therefore, the present invention provides a vision system that uses a drone or aerial platform and camera to provide enhanced viewing and image data capture of areas ahead or around the vehicle that may not be viewable by a camera or cameras of the vehicle (such as due to traffic or objects obstructing the field of view of the vehicle-based camera or cameras). The drone may be detached from and launched from the vehicle (such as from a docking station at the vehicle, such as at an exterior portion of the vehicle, with the docking station optionally providing for charging of the drone's battery when the drone is docked or attached at the vehicle) and may fly above or at or near the vehicle to capture image data of the area ahead of or surrounding the vehicle.

Optionally, control of the drone may be responsive to communication with the system of the vehicle, such that the drone travels with the vehicle and maintains a position generally above the vehicle as the vehicle is driven along the road. A vehicle-based control may control the drone (via wired or wireless communication) to follow the vehicle or to stray from the vehicle to view other areas remote of the vehicle. For example, if a traffic jam or high traffic situation occurs ahead of the vehicle, the control may control the drone to fly ahead to see the cause and/or length of the traffic backup. Optionally, the control may control the drone responsive to a user input, such as a voice command from the driver or such as a joystick control or such as a touch screen or the like in the vehicle. For example, the driver (or a passenger) of the vehicle may provide an input so that the control controls the drone to fly to a different location, such as sideward or rearward or ahead of where the vehicle is at). For example, a map display may be provided at a touch screen of the vehicle, and a user may touch a location near the vehicle, whereby the control controls the drone to fly to that location and capture image data of that location.

Optionally, the camera of the drone may be adjusted to view forwardly of the vehicle in the direction of travel of the vehicle, or the drone may rotate to direct the camera in any suitable or desired direction, such as in a direction where a camera of the vehicle (such as a front, side or rear camera) has its field of view at least partially obstructed. For example, if a side viewing camera has its field of view at least partially obstructed (such as determined via image processing of image data captured by that camera), the drone may be deployed and may rotate to have its camera (or one of its cameras if equipped with more than one camera) view in the direction of the side viewing (obstructed) camera. Thus, the drone may be operable to function as a spare camera to provide enhanced viewing for any camera of the vehicle that may at that time be obstructed.

The drone may communicate (in real time) captured image data to the vision system of the vehicle (such as for display of captured video images or for processing of captured image data), or the drone may store captured image data for later display or processing when the drone returns to the vehicle and docks at the vehicle. Optionally, the drone may include an image processor that processes captured image data, whereby the drone may communicate a signal to the vehicle vision system that is indicative of a detected object or the like.

Thus, responsive to a user input or responsive to processing of image data captured by one or more cameras of the vehicle or responsive to a communication from another vehicle or from infrastructure or the like, the control may cause the drone to detach from the vehicle or docking base at the vehicle and to fly above the vehicle to capture image data of areas outside of the field(s) of view of the vehicle camera(s) (such as beyond obstructions in the field(s) of view of the vehicle camera(s) or ahead of the vehicle beyond the field of view of a forward viewing vehicle camera or the like). The drone, when docked at the vehicle, may be disposed at an exterior of the vehicle (and may be hooked or clamped or otherwise retained at the docking station) and/or may rest in a recess of the vehicle and/or may be docked in a closed compartment of the vehicle (with the compartment having a panel that slides or pivots to open to deploy the drone and closes when the drone is docked at the vehicle. The control, when deploying the drone, controls the drone rotors and the docking station (to release hooks or clamps and/or to open a panel or the like) so that the drone can detach from the vehicle and elevate and fly above the vehicle. The drone flies above the vehicle and captures image data representative of areas outside of the field(s) of view of the vehicle camera(s) to provide enhanced object detection at obstructed areas or distant areas and/or to provide display of video images of such obstructed areas or distant areas.

The vehicle-based vision system receives image data captured by vehicle-based cameras and by the drone, and includes an image processor operable to process the captured image data, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source (such as an infrared or near infrared emitting source at the drone), if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The vehicle system (and optionally the drone) may also or otherwise include any type of sensor or sensors, such as imaging sensors or radar sensors or lidar sensors or ladar sensors or ultrasonic sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0276788; US-2017-0254873; US-2017-0222311 and/or US-2010-0245066, which are hereby incorporated herein by reference in their entireties.

Optionally, the vision system may include a display for displaying images captured by one or more of the imaging sensors or cameras (at the vehicle and/or at the drone) for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a forward viewing camera disposed at a vehicle equipped with said vision system, said forward viewing camera disposed behind a windshield of the equipped vehicle and viewing forward of the equipped vehicle through the windshield;
   a control disposed at the equipped vehicle, said control comprising an image processor operable to process image data captured by said forward viewing camera;
   an aerial platform comprising at least one drone camera disposed thereat;
   wherein said aerial platform is detachably disposed at the equipped vehicle and is detachable from the equipped vehicle and operable to fly at least above the equipped vehicle, said at least one drone camera capturing image data representative of an area viewed by said at least one drone camera with said aerial platform flying at least above the equipped vehicle;
   wherein, at least in part responsive to determination by said control, via processing of image data captured by said forward viewing camera, that the forward view of said forward viewing camera is obstructed, said control controls said aerial platform to detach from the equipped vehicle and to fly at least above the equipped vehicle;
   wherein, with said aerial platform detached from the equipped vehicle and flying at least above the equipped vehicle, said aerial platform wirelessly communicates image data captured by said at least one drone camera to said control disposed at the equipped vehicle;
   a video display disposed in the equipped vehicle and viewable by a driver of the equipped vehicle; and
   wherein said video display, with said aerial platform detached from the equipped vehicle and flying at least above the equipped vehicle, displays video images derived from image data captured by said at least one drone camera for viewing by the driver of the equipped vehicle.

2. The vision system of claim 1, wherein said control causes said aerial platform to detach from the equipped vehicle and fly at least above the equipped vehicle responsive to a traffic condition encountered by the equipped vehicle.

3. The vision system of claim 1, wherein, responsive to determination of a high traffic situation ahead of the equipped vehicle, said control controls said aerial platform to fly above and ahead of the equipped vehicle.

4. The vision system of claim 3, wherein, responsive to processing of image data captured by said at least one drone camera with said aerial platform flying above and ahead of the equipped vehicle, said control determines a length of a traffic backup ahead of the equipped vehicle.

5. The vision system of claim 1, wherein said control is operable to control said aerial platform to fly above and rearward of the equipped vehicle.

6. The vision system of claim 1, wherein said control, via processing of image data captured by said at least one drone camera with said aerial platform detached from the equipped vehicle and flying at least above the equipped vehicle, determines a high traffic condition ahead of the equipped vehicle.

7. The vision system of claim 1, wherein said aerial platform flies over a target region responsive to said control.

8. The vision system of claim 7, wherein said control controls said aerial platform to fly over the target region responsive to a user input of the equipped vehicle.

9. The vision system of claim 1, wherein, with said aerial platform detached from the equipped vehicle and flying at least above the equipped vehicle, said aerial platform moves along and above a path of travel of the equipped vehicle.

10. The vision system of claim 1, wherein, with said aerial platform detached from the equipped vehicle and flying at least above the equipped vehicle, said aerial platform flies at a height at or below a first height above the equipped vehicle.

11. The vision system of claim 10, wherein, with said aerial platform detached from the equipped vehicle and flying at least above the equipped vehicle, and responsive to determination that the equipped vehicle is in a traffic jam, said aerial platform flies at a second height above the equipped vehicle that is greater than the first height.

12. The vision system of claim 11, wherein said control, via processing of image data captured by said at least one drone camera with said aerial platform detached from the equipped vehicle and flying at least above the equipped vehicle at the second height above the equipped vehicle, determines a length of the traffic jam.

13. The vision system of claim 1, wherein said control, with said aerial platform detached from the equipped vehicle and flying at least above the equipped vehicle, and responsive to the field of view of the one of said forward viewing camera of the equipped vehicle being obstructed, controls said aerial platform to direct the field of view of said at least one drone camera in a viewing direction of said forward viewing camera.

14. The vision system of claim 1, wherein said image processor, with said aerial platform detached from the equipped vehicle and flying at least above the equipped vehicle, processes image data captured by said at least one drone camera to detect objects present in the field of view of said at least one drone camera.

15. The vision system of claim 14, wherein said control generates an alert indicative of objects detected in the field of view of said at least one drone camera.

16. The vision system of claim 1, wherein said at least one drone camera comprises a CMOS imaging photosensor array having at least one million photosensor elements.

17. A vision system for a vehicle, said vision system comprising:
   a forward viewing camera disposed at a vehicle equipped with said vision system, said forward viewing camera disposed behind a windshield of the equipped vehicle and viewing forward of the equipped vehicle through the windshield;
   a control disposed at the equipped vehicle, said control comprising an image processor operable to process image data captured by said forward viewing camera;
   an aerial platform comprising at least one drone camera disposed thereat;

wherein said at least one drone camera comprises a CMOS imaging photosensor array having at least one million photosensor elements;

wherein said aerial platform is detachably disposed at the equipped vehicle and is detachable from the equipped vehicle and operable to fly at least above the equipped vehicle, said at least one drone camera capturing image data representative of an area viewed by said at least one drone camera with said aerial platform flying at least above the equipped vehicle;

wherein, at least in part responsive to determination by said control, via processing of image data captured by said forward viewing camera, that the forward view of said forward viewing camera is obstructed, said control controls said aerial platform to detach from the equipped vehicle and to fly at least above the equipped vehicle;

wherein, with said aerial platform detached from the equipped vehicle and flying at least above the equipped vehicle, said aerial platform wirelessly communicates image data captured by said at least one drone camera to said control disposed at the equipped vehicle;

a video display disposed in the equipped vehicle and viewable by a driver of the equipped vehicle;

wherein said video display, with said aerial platform detached from the equipped vehicle and flying at least above the equipped vehicle, displays video images derived from image data captured by said at least one drone camera for viewing by the driver of the equipped vehicle; and wherein, responsive to processing of image data captured by said at least one drone camera with said aerial platform flying at least above and forward the equipped vehicle, said control determines at least one selected from the group consisting of (i) a high traffic situation ahead of the equipped vehicle and (ii) a length of a traffic backup ahead of the equipped vehicle.

18. The vision system of claim 17, wherein said aerial platform flies over a target region responsive to said control.

19. The vision system of claim 18, wherein said control controls said aerial platform to fly over the target region responsive to a user input of the equipped vehicle.

20. The vision system of claim 17, wherein, with said aerial platform detached from the equipped vehicle and flying at least above the equipped vehicle, said aerial platform flies at a height at or below a first height above the equipped vehicle.

21. The vision system of claim 20, wherein, with said aerial platform detached from the equipped vehicle and flying at least above the equipped vehicle, and responsive to determination that the equipped vehicle is in a traffic jam, said aerial platform flies at a second height above the equipped vehicle that is greater than the first height.

22. The vision system of claim 17, wherein said image processor, with said aerial platform detached from the equipped vehicle and flying at least above the equipped vehicle, processes image data captured by said at least one drone camera to detect objects present in the field of view of said at least one drone camera.

23. The vision system of claim 22, wherein said control generates an alert indicative of objects detected in the field of view of said at least one drone camera.

24. A vision system for a vehicle, said vision system comprising:

a forward viewing camera disposed at a vehicle equipped with said vision system, said forward viewing camera disposed behind a windshield of the equipped vehicle and viewing forward of the equipped vehicle through the windshield;

a control disposed at the equipped vehicle, said control comprising an image processor operable to process image data captured by said forward viewing camera;

an aerial platform comprising at least one drone camera disposed thereat;

wherein said at least one drone camera comprises a CMOS imaging photosensor array having at least one million photosensor elements;

wherein said aerial platform is detachably disposed at the equipped vehicle and is detachable from the equipped vehicle and operable to fly at least above the equipped vehicle, said at least one drone camera capturing image data representative of an area viewed by said at least one drone camera with said aerial platform flying at least above the equipped vehicle;

wherein, at least in part responsive to determination by said control, via processing of image data captured by said forward viewing camera, that the forward view of said forward viewing camera is obstructed, said control controls said aerial platform to detach from the equipped vehicle and to fly at least above the equipped vehicle;

wherein, with said aerial platform detached from the equipped vehicle and flying at least above the equipped vehicle, said aerial platform wirelessly communicates image data captured by said at least one drone camera to said control disposed at the equipped vehicle;

a video display disposed in the equipped vehicle and viewable by a driver of the equipped vehicle;

wherein said video display, with said aerial platform detached from the equipped vehicle and flying at least above the equipped vehicle, displays video images derived from image data captured by said at least one drone camera for viewing by the driver of the equipped vehicle; and wherein said image processor, with said aerial platform detached from the equipped vehicle and flying at least above the equipped vehicle, processes image data captured by said at least one drone camera to detect objects present in the field of view of said at least one drone camera.

25. The vision system of claim 24, wherein said control causes said aerial platform to detach from the equipped vehicle and fly at least above the equipped vehicle responsive to a traffic condition encountered by the equipped vehicle.

26. The vision system of claim 24, wherein, responsive to determination of a high traffic situation ahead of the equipped vehicle, said control controls said aerial platform to fly above and ahead of the equipped vehicle.

27. The vision system of claim 24, wherein said control is operable to control said aerial platform to fly above and rearward of the equipped vehicle.

28. The vision system of claim 24, wherein said control, via processing of image data captured by said at least one drone camera with said aerial platform detached from the equipped vehicle and flying at least above the equipped vehicle, determines a high traffic condition ahead of the equipped vehicle.

29. The vision system of claim 24, wherein said aerial platform flies over a target region responsive to said control.

30. The vision system of claim 29, wherein said control controls said aerial platform to fly over the target region responsive to a user input of the equipped vehicle.

31. The vision system of claim 24, wherein, with said aerial platform detached from the equipped vehicle and flying at least above the equipped vehicle, said aerial platform moves along and above a path of travel of the equipped vehicle.

32. The vision system of claim 24, wherein said control, with said aerial platform detached from the equipped vehicle and flying at least above the equipped vehicle, and responsive to the field of view of the one of said forward viewing camera of the equipped vehicle being obstructed, controls said aerial platform to direct the field of view of said at least one drone camera in a viewing direction of said forward viewing camera.

33. The vision system of claim 24, wherein said control generates an alert indicative of objects detected in the field of view of said at least one drone camera.

\* \* \* \* \*